United States Patent

Perrault et al.

[11] Patent Number: 5,307,752
[45] Date of Patent: May 3, 1994

[54] SUSPENSION SYSTEM FOR SUPPORTING OBJECTS ON SHIPS

[76] Inventors: Frederick Perrault, 1727 Date Ave., Torrance, Calif. 90503; Raymond E. Perrault, 3845 Crest Rd., Rancho Palos Verdes, Calif. 90274

[21] Appl. No.: 38,540
[22] Filed: Mar. 29, 1993
[51] Int. Cl.⁵ .............................................. B63B 9/00
[52] U.S. Cl. .................................. 114/221 R; 248/59
[58] Field of Search ................ 114/201 R, 65 R, 364; 248/59, 70, 74.1, 612, 227

[56] References Cited

U.S. PATENT DOCUMENTS

| | | | |
|---|---|---|---|
| 418,704 | 1/1890 | Duggan | 248/70 X |
| 883,138 | 3/1908 | Kirchhoff | 248/70 |
| 1,362,244 | 12/1920 | Farley . | |
| 1,843,874 | 2/1932 | Hurst | 114/364 X |
| 2,339,565 | 1/1944 | Goldberg et al. | 248/59 |
| 3,273,837 | 9/1966 | Willert et al. | 248/59 |
| 3,334,851 | 8/1967 | Cassidy et al. | 248/68 |
| 3,355,132 | 11/1967 | Jenkins | 248/59 |
| 3,506,227 | 4/1970 | Jenkins | 248/59 |
| 3,517,901 | 6/1970 | Jenkins | 248/59 |
| 3,528,634 | 9/1970 | Jenkins | 248/70 |
| 3,575,367 | 4/1971 | Welsh et al. | 248/59 |
| 4,637,175 | 1/1987 | Froening et al. | 248/59 X |
| 4,799,444 | 1/1989 | Lisowski | 114/221 R |
| 4,915,534 | 4/1990 | Richards | 403/189 |
| 4,960,253 | 10/1990 | Perrault et al. | 248/68 |
| 5,088,675 | 2/1992 | Perrault et al. | 248/59 X |
| 5,160,107 | 11/1992 | Perrault et al. | 248/59 X |

FOREIGN PATENT DOCUMENTS

| | | |
|---|---|---|
| 434681 | 9/1926 | Fed. Rep. of Germany . |
| 3309758A1 | 3/1983 | Fed. Rep. of Germany . |
| 445970 | 3/1968 | Switzerland . |

*Primary Examiner*—Sherman Basinger
*Attorney, Agent, or Firm*—Richard F. Carr

[57] ABSTRACT

A supporting arrangement for objects such as light fixtures and pipes on ships is provided which includes a vertical support which at its lower end engages the object to be supported and at its upper end connects by bolts to a stud welded to the deck of the ship. A brace connects with a clamp that can be positioned where desired along the support member to an angle bracket which is carried by a short post welded to the deck at a location remote from the weld stud.

13 Claims, 3 Drawing Sheets

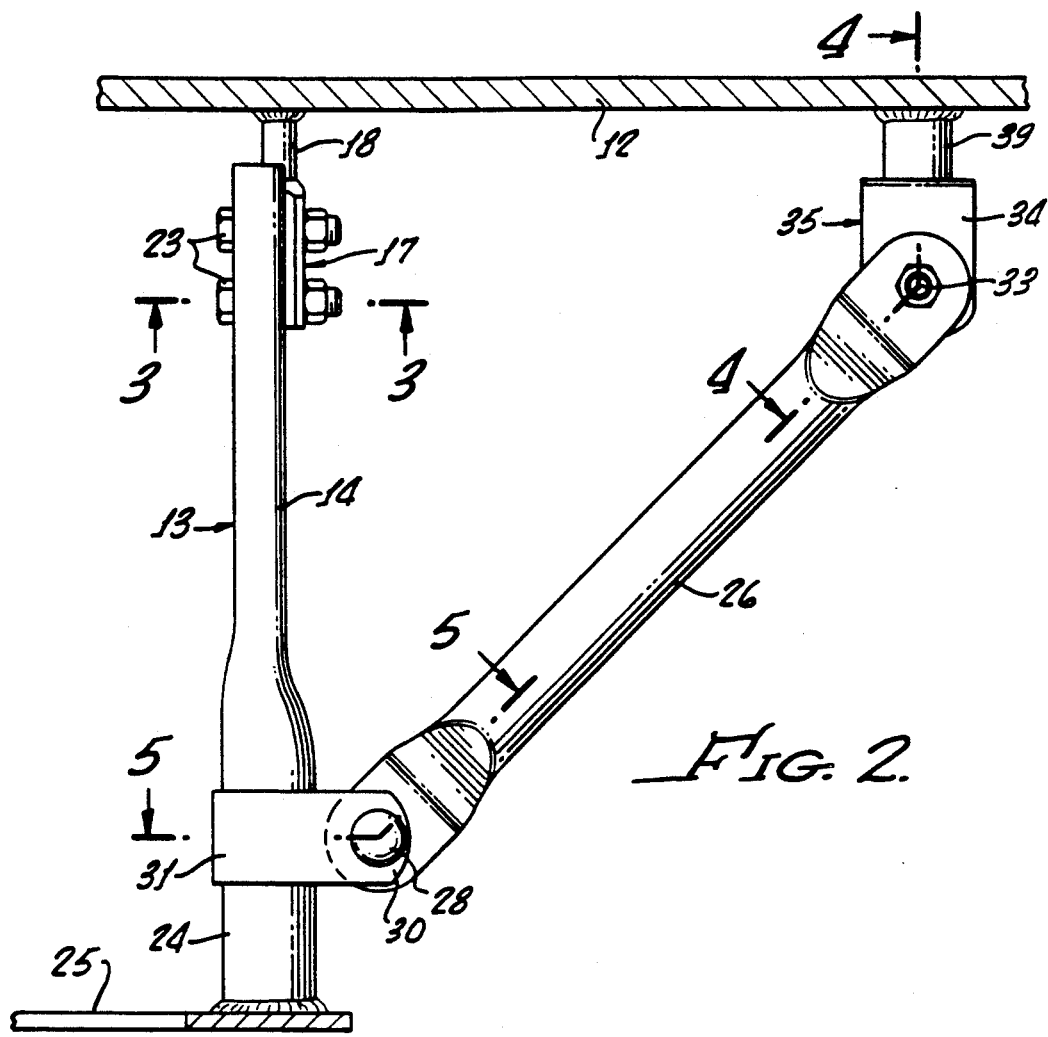
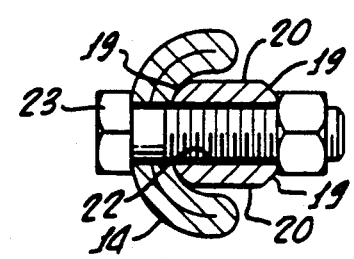
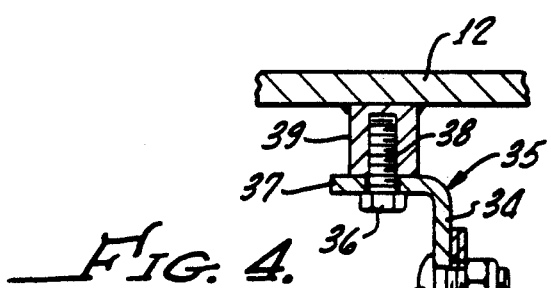
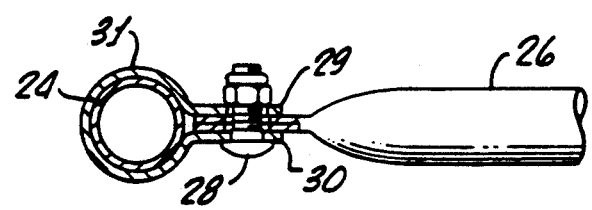
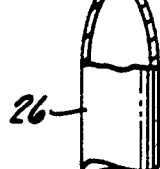
FIG. 2.
FIG. 3.
FIG. 4.
FIG. 5.

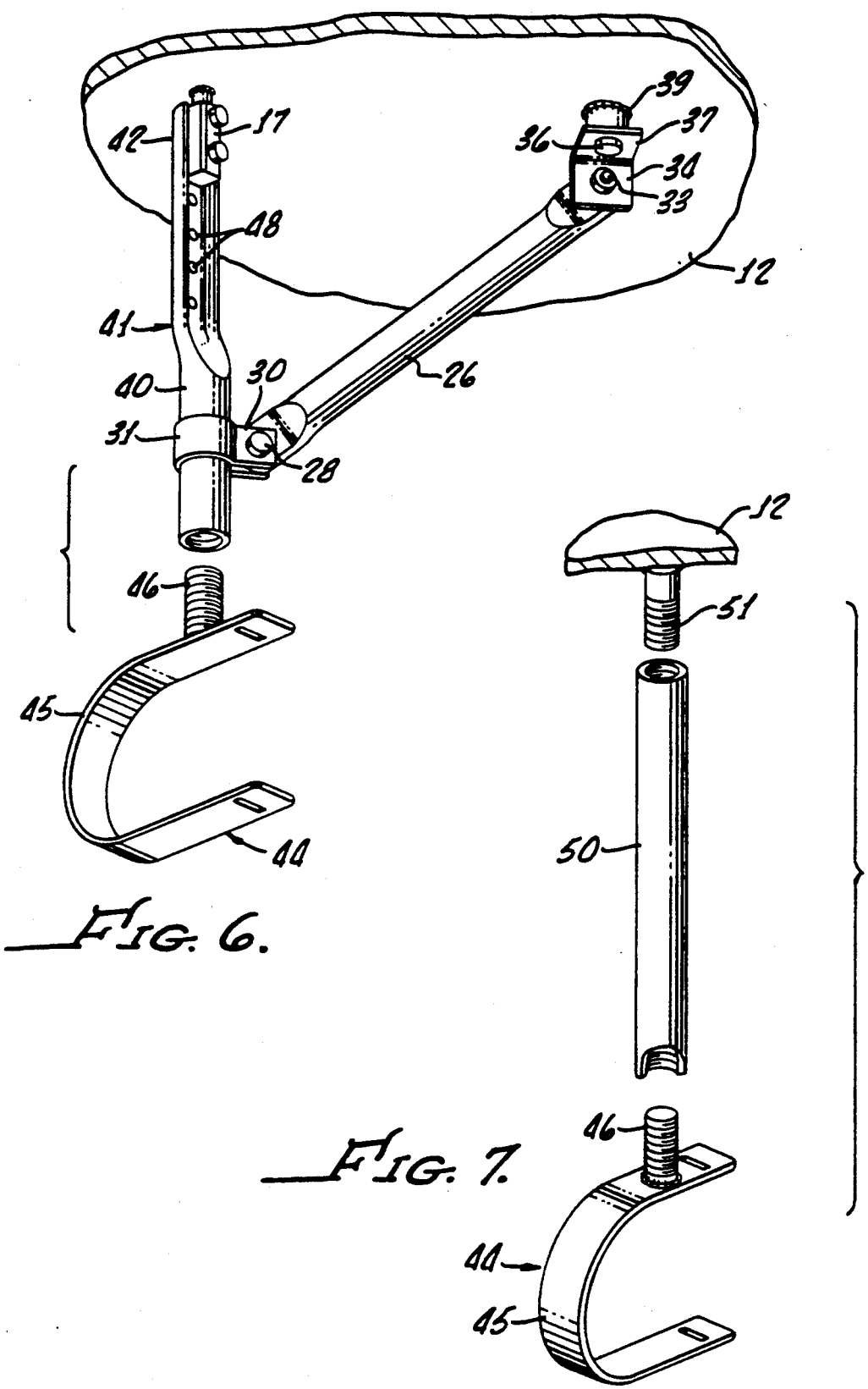

SUSPENSION SYSTEM FOR SUPPORTING OBJECTS ON SHIPS

BACKGROUND OF THE INVENTION

On ships, in particular, naval ships, it is the practice to suspend light fixtures, pipes, ducts and other objects from a deck above. The fixtures or other objects must be supported at different distances from the deck above because of varying spacing and different height requirements. Making such installations conventionally is a slow and expensive operation. Typically, a tubular vertical support is welded at its upper end to the deck and extends downwardly to the fixture. A brace extends outwardly from the vertical support at an angle, being welded to the vertical support at one end and to the deck at the other. These welding operations require heavy, bulky welding equipment which must be moved throughout the ship under construction to accomplish the necessary welds at the different locations where supports are needed. This disrupts other construction operations on the ship, requires insulation blankets for the cables, and generally is a very awkward and slow operation. The brace generally is a tubular member which is scarfed at its ends so that it will be flush with the vertical support at one end and with the deck at the other. The cutting of the brace is accomplished generally off the ship, with the brace then being brought to the location of the support for attachment. It is not always possible to estimate the precise angle necessary for the ends of the brace to enable it to be connected both to the vertical support and to the deck at an available location. The length of the brace may not be correct. Often costly rework is necessary.

Hence, there has been a need for an improved arrangement for suspending light fixtures or the like to reduce the cost, complexity and time of assembly for ship construction.

BRIEF SUMMARY OF THE INVENTION

According to the present invention, standard parts may be provided for suspending light fixtures, pipes or the like, with ready adjustability and the avoidance of expensive welding operations. The vertical support member is connected to a weld stud which can be welded to the deck above in only a few seconds. Lightweight portable equipment is used for such welds rather than the bulky and heavy welding equipment used for welding the supports in the past. The vertical support is tubular with its upper end collapsed and being given a concave contour so that it can wrap around one side of the weld stud to which it is attached by bolts. A series of bolt holes is provided in the upper end of the vertical support so that it can be cut to a desired length with any selected pair of the openings through the support being used for connection to the weld stud.

The brace is a tubular member with flattened ends, the lower one of which is received in between the opposed flanges of a circular clamp that circumscribes the lower end portion of the vertical support. The location of the clamp is readily varied by merely sliding it upwardly or downwardly along the vertical support before the bolt connection to the brace is tightened. The upper end of the brace bolts to one flange of a right angle bracket. The other flange of the angle bracket includes an opening through which a screw extends to enter a threaded opening in the end of a second weld stud that is welded to the deck at a location spaced from the first weld stud. A perfect fit may be obtained by appropriately rotating the clamp and the angle bracket and sliding the clamp to the proper position along the vertical support to suit the length of the brace prior to tightening the connecting bolts. The complete installation is accomplished in only a fraction of the time necessary when following the practices of the prior art.

BRIEF DESCRIPTION OF THE DRAWINGS

FIG. 2 is an enlarged side-elevational view, partially in section, showing one of the support assemblies;

FIG. 3 is a transverse sectional view taken along line 3—3 of FIG. 2;

FIG. 4 is a sectional view taken along line 4—4 of FIG. 2;

FIG. 5 is a sectional view taken along line 5—5 of FIG. 2;

FIG. 6 is a perspective view of the support system as modified for suspending a pipe; and FIG. 7 is a perspective view of a further modification of the support.

As shown in FIGS. 1–5, the support unit 10 suspends an object 11, such as a light fixture, from a deck 12 of a ship. The light fixture 11 is elongated so that two support assemblies 10 are employed, each including a vertical member and a brace. When the object to be supported is smaller, only one support assembly is needed so that there is then only one vertical member and brace.

Figure 1:
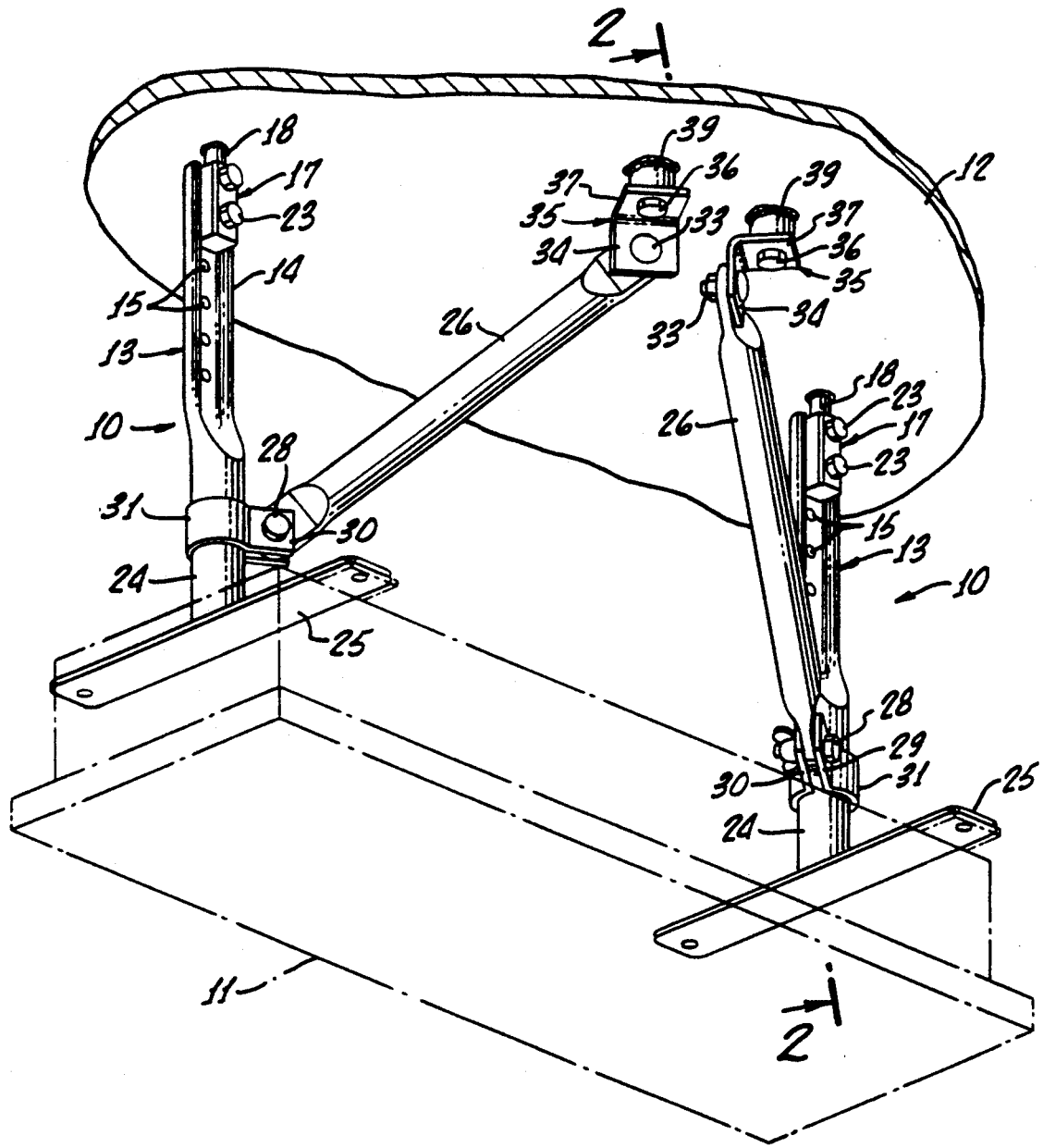
FIG. 1 is a perspective view illustrating the support system of this invention.

The vertical member 13 of each support assembly 10 is tubular but with its upper end portion 14 collapsed so that one wall engages the other, as best seen in FIG. 3. The upper portion 14 is given an arcuate configuration in end elevation. Spaced openings 15 are provided through the upper portion 14 in a series extending longitudinally at its center. The vertical member 13 is attached to a weld stud 17 which has a cylindrical upper portion 18 welded to the undersurface of the deck 12. The lower portion of the weld stud 17 includes rounded corners 19 that interconnect four flat surfaces 20. Two openings 22 extend through the lower portion of the weld stud 17 interconnecting two opposite flat surfaces 20. The upper portion 14 of the vertical member 13 overlies one side of the lower portion of the weld stud 17, with the arcuate contour of the upper portion 14 complementarily overlying two rounded corners 19. The openings 15 in the upper portion 14 of the member 13 are aligned with two openings 22 through the lower portion of the weld stud and the attachment is accomplished by means of bolts 23 extending through these openings. The result is a stable connection between the vertical member 13 and the weld stud.

The bottom end portion 24 of the member 13, where its tubular contour is not collapsed, is welded to a transverse flat bracket 25 which, in turn, connects to the light fixture 11.

A brace 26 is provided for each of the support assemblies 10, positioned at an acute angle relative to the vertical support member 13. The brace 26 is an elongated tubular member having flattened ends, each having an opening through it. One end of the brace 26 receives a bolt 28 which also extends through the opposite radial end flanges 29 and 30 of a circular clamp 31. The end of the brace 26 is received between the flanges 29 and 30, and the clamp 31 circumscribes the cylindrical outer surface of the lower portion 24 of the vertical support member 13. Consequently, the brace 26 may be given any desired angular orientation relative to the vertical support and, when the bolt 28 is tightened, a secure connection is achieved which also compresses the clamp 31 and causes it to frictionally grip the vertical member 13. This locks the clamp 31 to the vertical support member 13 and to the brace 26. Prior to tightening the bolt 28, the clamp 31 may be slid along the member 13 to a desired vertical position.

The opposite end of the brace 26 connects by a bolt 33 to one flange 34 of an angle bracket 35. A screw 36 extends through the other flange 37 of the angle bracket 35, which is at right angles to the flange 34. The screw 36 threads into a tapped opening 38 in the outer end of a weld stud 39 which is welded to the undersurface of the deck 12 at a location spaced from the weld stud 17.

As a result of this construction, an object to be supported can be fully secured and braced in only a few minutes of time without the use of heavy, bulky welding equipment or expensive trial and error cutting and welding procedures. The weld studs 17 and 39 can be attached to the deck 12 by portable welding equipment that accomplishes each weld in around ten seconds. The upper end portions 14 of the vertical members 13 can be cut to length so that any desired pair of the openings 15 matches with the openings 22 and the weld stud 17. Therefore, it is necessary to include only a few stock sizes of the members 13 which can be cut to provide the appropriate support height for any situation.

The braces can be of standard lengths which will accommodate all circumstances encountered. This is because, before the connecting bolts are tightened, the lower end of the brace 26 may be raised or lowered at the member 13 as the upper end of the brace pivots about the bolt 33. Thus, if the brace 26 is a little short, clamp 31 merely is raised relative to the lower end portion 24 of the member 13 to reduce the distance to the angle bracket 35. Conversely, the clamp 31 may be lowered to increase the distance from the angle bracket. Moreover, both the clamp 31 and the angle bracket 35 may be rotated prior to tightening the fasteners 28, 33 and 36 so that proper alignment and orientation of the ends of the brace 26 always may be achieved.

The support arrangement is applied to a pipe hanger in the embodiment of FIG. 6. Here the lower end of the tubular lower portion 40 of the vertical support member 41 is internally threaded. The upper portion 42 is identical to the upper portion 14 of the vertical support member 13.

A clamp 44 includes a U-shaped portion 45 that extends around a pipe to be suspended. A threaded stud 46 projects from one side of the clamp 44 and threads into the tapped bottom portion of the vertical member 41. This securely attaches the pipe clamp 44 to the vertical support member 41.

A clamp 31 circumscribes the lower portion 40 of the member 41 and connects to a brace 26, just as in the other embodiment. At the upper end of the brace 26 is an angle bracket 35 which is bolted to the brace and also to a tapped weld stud 39. Therefore, the brace can be oriented and positioned by its ability to pivot at the clamp 31 and angle bracket 35, as well as the rotation allowed the angle bracket at the weld stud 39. The clamp 31 may be slid vertically along the lower portion 40 of the vertical member 41 to achieve the proper spacing from the clamp to the angle bracket 35. As before, the upper end portion 42 may be cut to any desired length so that any two of the openings 48 through it may be matched with the openings in the weld stud 17 to which it is attached. In this manner, the desired height for the clamp 44 may be achieved so that the pipe it carries will be at the proper level.

In some instances, it will be possible to support the pipe clamp 44 only with the vertical support member 41, omitting the brace 26.

As shown in FIG. 7, the pipe clamp 44 may be threaded into a lower tapped end of a tube 50 which acts as a vertical support. The upper end of the tube 50 also is tapped and engages a threaded weld stud 51. This arrangement provides a secure attachment and can be used with the brace 26. However, adjustability in length of the vertical support is lacking.

Where a pipe is to be supported close to a deck, the threaded stud 46 of the clamp 44 may be engaged directly with the tapped weld stud 39.

While the present invention has been depicted, described, and is defined by reference to particularly preferred embodiments of the invention, such reference does not imply a limitation on the invention, and no such limitation is to be inferred. The invention is capable of considerably modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. In combination with a structure, an arrangement for suspending an object from said structure comprising a weld stud welded to said structure,
   an elongated support member,
      one end portion of said support member engaging said weld stud,
      the opposite end of said support member including means for connection to an object to be supported,
   first fastener means connecting said one end portion of said support member to said weld stud,
   a clamp member engaging said support member adjacent said opposite end and positionable in various locations along the length of said support member,
   an elongated brace member of predetermined fixed length having one end engaging said clamp member and extending from said clamp member at an acute angle to said support member,
   means for attaching the opposite end of said brace to said structure at a location remote from said weld stud, said last-mentioned means including means for permitting said opposite end of said brace to rotate about two different axes, and
   second fastener means for securing said clamp member to said support member so that it frictionally grips said support member and is in a fixed position relative thereto, and for securing said brace to said clamp member.

2. A device as recited in claim 1 in which said means for attaching said brace to said structure includes a second weld stud welded to said structure at a location remote from said first mentioned weld stud, a bracket means engaging the end of said second weld stud, second fastener means attaching said bracket means to said second weld stud, and third fastener means attaching said opposite end of said brace to said bracket means such that said brace is rotatable relative to said bracket means before tightening said third fastener means, and said bracket means is rotatable relative to said second weld stud prior to tightening said second fastener means.

3. In combination with a structure, an arrangement for suspending an object from said structure comprising
   a weld stud welded to said structure,
       said weld stud including an end part having at least one transverse opening therethrough,
   a vertical support member,
       one end portion of said vertical support member being concave in cross-section and having at least one opening therethrough, said one end portion of said vertical support member overlying said end part of said weld stud,
       the opposite end of said vertical support member including means for connection to an object to be supported,
   first fastener means connecting said one end portion of said vertical support member to said weld stud by extending through said openings in said vertical support member and said weld stud, a clamp member extending around said vertical support member adjacent said opposite end and movable lengthwise along said vertical support member,
   an elongated brace member extending from said clamp member at an acute angle to said vertical support member,
   means for attaching said brace to said structure at a location remote from said weld stud, and
   second fastener means for compressing said clamp member so that it frictionally grips said vertical support member and is in a fixed position relative thereto, and for attaching said brace to said clamp member.

4. A device as recited in claim 3 in which said means for attaching said brace to said structure includes a second weld stud welded to said structure, an angle bracket having two flanges, a fastener connecting one flange of said angle bracket to said second weld stud, and a fastener connecting the other flange of said angle bracket to said brace.

5. A device as recited in claim 3 in which said vertical support adjacent said opposite end has a cylindrical outer contour, and in which said clamp member includes a generally circular portion circumscribing said cylindrical part of said vertical support member, and a plurality of flanges which engage said second fastener means and said brace.

6. A device as recited in claim 5 in which said brace has an end portion received between said flanges, and said second fastener means is a bolt extending through said flanges and said end portion of said brace.

7. A device as recited in claim 3 in which said vertical support is tubular, said one end portion of said vertical support being collapsed transversely so that the opposite walls thereof are brought together.

8. A device as recited in claim 3 in which said one end portion of said vertical support member has a series of openings therethrough, whereby said one end portion can be cut to a predetermined length to permit said first fastener means to extend through a selected one of said openings in said one end portion and said vertical support member can position an object to be supported at a desired vertical location.

9. The method of supporting an object from a structure comprising the steps of
   welding a stud to said structure,
   extending an elongated support member downwardly from said stud,
   connecting said object to the lower end portion of said support member,
   positioning a clamp on said support member, providing an elongated brace member of a predetermined fixed length,
   providing a means for attachment of said brace to said structure at a location remote from said weld stud so that said brace can rotate relative to said structure about two different axes,
   moving said clamp on said support member to a location where said clamp is spaced from said means for attachment a distance equal to said predetermined length,
   attaching one end of said brace to said means for attachment and the opposite end of said brace to said clamp, and
   compressing said clamp so that it frictionally grips said support member and is retained at said location,
   whereby said brace can prevent lateral movement of said support member and said object.

10. The method as recited in claim 9 in which said clamp is provided with a portion extending around the lower portion of said support member, and is provided with flange means projecting from said portion of said clamp, and said opposite end of said brace is attached to said flange means.

11. The method as recited in claim 9 in which the lower portion of said support member is provided with a cylindrical exterior surface, said clamp is provided with a generally circular portion which is extended around said lower portion of said support member, and a duality of flanges projecting outwardly from said generally circular portion, and said opposite end of said brace is attached to said flanges.

12. The method as recited in claim 11 in which for attaching said opposite end of said brace to said flanges said opposite end is positioned between said flanges, and a fastener is extended through said flanges and said opposite end, whereby the tightening of said fastener both attaches said opposite end to said brace and so compresses said clamp so that it frictionally grips said support member.

13. The method of supporting an object from a structure comprising the steps of
   welding a stud to said structure,
   extending an elongated support member downwardly from said stud,
   connecting said object to the lower end portion of said support member,
   positioning a clamp on said support member, providing an elongated brace member of a predetermined length,
   providing a means for attachment of said brace to said structure at a location remote from weld stud by welding a second stud to said structure,
   providing an angle bracket with two flanges, one of which is brought into engagement with the outer end of said second weld stud, and extending a fastener through said one flange of said angle bracket and into engagement with said outer end of said second weld stud, moving said clamp on said support member to a location where said clamp is spaced from said means for attachment a distance equal to said predetermined length, attaching one end of said brace to said means for attachment by extending a fastener through the other flange of said angle bracket and through said one end of said brace, whereby said angle bracket can be rotated relative to said second stud and said brace rotated relative to said angle bracket prior to tightening said fastener that engages said second weld stud and said fastener that extends through said other flange, attaching the opposite end of said brace to said clamp, and compressing said clamp so that it frictionally grips said support member and is retained at said location, whereby said brace can prevent lateral movement of said support member and said object.

* * * * *